US012207057B2

(12) United States Patent
Grossman et al.

(10) Patent No.: US 12,207,057 B2
(45) Date of Patent: Jan. 21, 2025

(54) APPARATUS AND METHOD FOR TREATING TINNITUS

(71) Applicant: Peacenquiet, Inc., Minnetonka, MN (US)

(72) Inventors: Andrew Grossman, Minneapolis, MN (US); Robert W. Hasel, Stillwater, MN (US)

(73) Assignee: Peacenquiet, Inc., Minnetonka, MN (US)

( * ) Notice: Subject to any disclaimer, the term of this patent is extended or adjusted under 35 U.S.C. 154(b) by 0 days.

(21) Appl. No.: 18/418,733

(22) Filed: Jan. 22, 2024

(65) Prior Publication Data

US 2024/0163622 A1 May 16, 2024

Related U.S. Application Data

(63) Continuation of application No. 17/713,633, filed on Apr. 5, 2022, now abandoned.

(60) Provisional application No. 63/170,613, filed on Apr. 5, 2021.

(51) Int. Cl.
*H04R 25/00* (2006.01)

(52) U.S. Cl.
CPC ........... *H04R 25/75* (2013.01); *H04R 25/505* (2013.01); *H04R 25/558* (2013.01); *H04R 2225/55* (2013.01)

(58) Field of Classification Search
CPC ........... A61B 5/12; A61B 5/123; A61B 5/128; H04R 25/75; H04R 25/505; H04R 25/558; H04R 2225/55
See application file for complete search history.

(56) References Cited

U.S. PATENT DOCUMENTS

| | | |
|---|---|---|
| 4,222,393 A | 9/1980 | Hocks |
| 5,735,885 A | 4/1998 | Howard, III |
| 6,210,321 B1 | 4/2001 | Di Mino |

(Continued)

FOREIGN PATENT DOCUMENTS

| | | |
|---|---|---|
| CN | 111407286 A | 7/2020 |

OTHER PUBLICATIONS

Indian Institute of Technology Bombay, "Method and device generating tinnitus matched data with system and method providing management of tinnitus", Sep. 20, 2018. (Year: 2018).

*Primary Examiner* — Brian Ensey
(74) *Attorney, Agent, or Firm* — Forsgren Fisher McCalmont DeMarea Tysver LLP; James M. Urzedowski; Daniel A. Tysver

(57) ABSTRACT

A system and method are presented for treating tinnitus which include identifying separate treatment signal settings for a patient having a heard tinnitus noise in a left ear and a right ear by separately selecting each ear in turn. Treatment signal settings for a selected ear are identified by presenting audible signal to the selected ear at a variety of frequencies, amplitudes, phases and shapes in order to provides an audible signal that is near to that of a perceived tinnitus sound. Storing the frequency, amplitude, phase and wave shape as the separate treatment signal settings for the selected ear. Using the treatment signal settings for the left ear to generate a left ear treatment signal that is presented to the left ear, and using the treatment signal settings for the right ear to generate a right ear treatment signal that is presented to the right ear.

20 Claims, 8 Drawing Sheets

(56) References Cited

U.S. PATENT DOCUMENTS

| | | | | |
|---|---|---|---|---|
| 6,846,284 | B2 | 1/2005 | Choy | |
| 7,347,827 | B2 | 3/2008 | Choy | |
| 9,522,085 | B2 | 12/2016 | Kilgard | |
| 10,225,671 | B2 | 3/2019 | Goorevich | |
| 10,758,165 | B2 | 9/2020 | Hauptmann | |
| 10,842,418 | B2 | 11/2020 | Micheyl | |
| 10,850,060 | B2 | 12/2020 | Searchfield | |
| 2015/0164381 | A1* | 6/2015 | Rush | A61B 5/128 381/73.1 |
| 2019/0344073 | A1 | 11/2019 | Baker | |

* cited by examiner

APPARATUS AND METHOD FOR TREATING TINNITUS

CROSS-REFERENCE TO RELATED CASES

This application is a continuation application claiming priority to U.S. application Ser. No. 17/713,633, filed Apr. 5, 2022, which is in turn, a utility application claiming priority to provisional application U.S. 63/170,613, filed Apr. 5, 2021. The entire contents of each being incorporated herein by reference.

FIELD OF THE INVENTION

The present application is related to reducing the effects of tinnitus.

BACKGROUND OF THE INVENTION

Tinnitus is a recurring audio signal that is an annoyance and stress inducing to the patient. Embodiments described herein look to reduce the effects by treating the specific spectrum (spectra) of the tinnitus and reduce it using a variety of techniques and methods. Known techniques and methods are disclosed in U.S. Pat. No. 7,347,827 to Choy; U.S. Pat. No. 8,795,193 to Zeng et al.; U.S. Pat. No. 9,522,085 to Kilgard et al.; and U.S. Pat. No. 10,223,671 to Goorevich et al., the entire contents of each being incorporated herein by reference.

In some tinnitus cases an actual physical noise may be detected in the ear of a patient by a microphone. In other cases, the tinnitus does not originate with a physical noise within the ear. Rather, the tinnitus is being generated by a nerve impulse running to the brain through the eighth cranial nerve (the "auditory nerve"). These nerve signals are not representative of physical noise within the ear, but instead present a non-varying tinnitus signal to the brain. An electrical probe or sensor in or near the ear can identify the nerve signals passing through the auditory nerve, and thus identify the tinnitus.

Often however, direct detection of tinnitus is not possible. An alternative means of analyzing the tinnitus is to present a variety of noise signals to a patient and ask the patient to identify a sound frequency that is most similar to the tinnitus being heard by the patient. A slow frequency sweep of sound signals can be presented, and the patient is asked to stop the sweep when the frequency is approximately equal to the heard tinnitus signal.

While these known tinnitus detection and treatment techniques may provide some mitigation of tinnitus symptoms, they often fail end the tinnitus completely. Also, many existing detection and treatment options are time consuming, and require a hospital or clinic setting.

A need exists for a tinnitus analysis and treatment method that provides improved patient outcomes and which may be incorporated into a compact electronic system, such as for example a smart phone or even a hearing aid, that the patient may self-administer without the need of a clinician.

SUMMARY OF THE INVENTION

Embodiments of the present invention are designed to potentially sense tinnitus and analyze it, as well as to provide for the ability to allow the patient to self-assess the tinnitus if it cannot be directly detected. Each ear of a patient is assessed and treated separately.

Cancelling of the tinnitus occurs through the application of a sound into the ear. The frequency and amplitude of the sound is selected to match the dominant frequency and amplitude of the tinnitus symptom. Phase shifting is used to further decrease the symptoms. Finally, different shapes of sound waves are tested to find a best match for the tinnitus signals. Fine tuning maximizes the reduction of symptoms. The matching of sound to that of the tinnitus of the given ear may be done automatically and/or with manual input from the patient/user.

The canceling functionality can be built into a hearing aid or other device. The canceling function can be based around a noise cancellation circuit.

Exemplary embodiments are described in the following paragraphs:

A method for treating tinnitus includes identifying separate treatment signal settings for a patient suffering a heard tinnitus noise in a left ear and a right ear by separately selecting each ear in turn. Treatment signal settings for a selected ear are identified by presenting a first audible signal to the selected ear at a variety of frequencies. Receiving confirmation that a first frequency for the first audible signal is near a tinnitus frequency for the heard tinnitus noise in the selected ear. Presenting a second audible signal to the selected ear at the first frequency wherein the second audible signal is presented at a variety of amplitudes. Receiving confirmation that a first amplitude for the second audible signal is near a tinnitus amplitude for the heard tinnitus noise in the selected ear. Presenting a third audible signal to the selected ear at the first frequency and the first amplitude. The third audible signal being presented with a variety of wave shapes. Receiving confirmation that a first wave shape for the third audible signal triggers a reduction in the heard tinnitus noise in the selected ear. Storing the first frequency, the first amplitude, and the first wave shape as the separate treatment signal settings for the selected ear. Using the treatment signal settings for the left ear to generate a left ear treatment signal that is presented to the left ear, and using the treatment signal settings for the right ear to generate a right ear treatment signal that is presented to the right ear.

In some embodiments of the method, the first frequency is fine-tuned against the heard tinnitus noise in the selected ear after receiving the confirmation that the first wave shape triggers the reduction in the heard tinnitus noise for the selected ear.

In some embodiments of the method, the first frequency is fine-tuned by presenting a fourth audible signal at the first amplitude and the first wave shape at a plurality of frequencies proximal to the first frequency.

In some embodiments of the method, the first amplitude is fine-tuned against the heard tinnitus noise in the selected ear by presenting a fifth audible signal at the first frequency and the first wave shape at a plurality of amplitudes proximal to the first amplitude.

In some embodiments of the method, after a delay, the left ear treatment signal is re-presented to the left ear and/or the right ear treatment signal is re-presented to the right ear. In some embodiments retreatment may occur after a delay of mere moments. In some embodiments, the delay is greater than a day.

In some embodiments of the method, the left ear treatment signal and the right ear treatment signal are saved as recordings, and the recordings are used to re-present the ear treatment signals.

In some embodiments of the method, the left ear treatment signal and the right ear treatment signal are recreated using the separate treatment signal settings.

In some embodiments of the method, the method includes presenting a fourth audible signal to the selected ear at the first frequency and the first amplitude, the fourth audible signal being presented at a variety of phase shifts; receiving confirmation that a first phase shift for the fourth audible signal reduces the heard tinnitus noise in the selected ear; and storing the first phase shift as part of the separate treatment signal settings for the selected ear.

In some embodiments of the method, the fourth audible signal is presented after the third audible signal, wherein the fourth audible signal is presented using the first wave shape.

In some embodiments of the method, the fourth audible signal is presented before the third audible signal, wherein the third audible signal is presented using the first phase shift.

In at least one embodiment of the method, the variety of wave shapes include some combination of a sine wave, a square wave, a triangle wave, a pulse wave, and a sawtooth wave.

In at least one embodiment of the method, the third audible signal is presented with the variety of wave shapes by switching between the sine wave, the square wave, the triangle wave, and the sawtooth wave.

In at least one embodiment of the method, wherein the variety of wave shapes further comprises intermediate wave shapes that comprise a transition from one shape to another.

In at least one embodiment, a mobile device includes the following components: a processor, a sound output, and a tinnitus app. The processor processes programming instructions. The sound output separately outputs sound for a left ear and a right ear. The tinnitus app includes programming instructions that instruct the processor to identify separate signal settings for the left ear and the right ear by separately selecting each ear in turn. Signal settings for a selected ear are identified by presenting a first audible signal to the selected ear through the sound output at a variety of frequencies and receiving confirmation through a user interface that a first frequency for the first audible signal is near a tinnitus frequency. A second audible signal is presented to the selected ear through the sound output at the first frequency. The second audible signal is presented at a variety of amplitudes. Confirmation is received through the user interface that a first amplitude for the second audible signal is near a tinnitus amplitude. A third audible signal is presented to the selected ear through the sound output at the first frequency and the first amplitude. The third audible signal is presented with a variety of wave shapes. Confirmation is received through the user interface that a first wave shape for the third audible signal triggers a reduction in a heard tinnitus noise in the selected ear. The first frequency, the first amplitude, and the first wave shape are stored as the separate signal settings for the selected ear. The treatment signal settings for the left ear are used to generate a left ear sound signal that is presented to the left ear. The treatment signal settings for the right ear are used to generate a right ear sound signal that is presented to the right ear.

In some embodiments of the mobile device, the programming instructions further instruct the processor to identify separate signal sittings by presenting a fourth audible signal to the selected ear at the first frequency and the first amplitude. The fourth audible signal being presented at a variety of phase shifts, and receiving confirmation that a first phase shift for the fourth audible signal reduces the heard tinnitus noise in the selected ear.

In some embodiments of the mobile device, the programming instructions further instruct the processor to identify separate signal sittings by presenting a fourth audible signal to the selected ear at the first frequency and the first amplitude. The fourth audible signal being presented at a variety of phase shifts. Confirmation is received that a first phase shift for the fourth audible signal reduces the heard tinnitus noise in the selected ear. The first phase shift is stored as part of the separate signal settings for the selected ear.

In some embodiments of the mobile device, the variety of wave shapes include some combination of a sine wave, a square wave, a triangle wave, a pulse wave, and a sawtooth wave.

DETAILED DESCRIPTION

Embodiments described herein are directed to a system for analyzing tinnitus in the individual ears of a patient and utilizing the system and method to mitigate and/or cancel the tinnitus by treating the specific spectrum (spectra) of the tinnitus. The goal of the analysis is to detect a primary frequency of the tinnitus. This frequency can then be used to test treatment signals of nearby frequencies. The treatment signal will varied between multiple amplitudes, signal shapes, and phases in order to achieve an effective cancelation of the tinnitus. The goal is to achieve a "null" in which the tinnitus signal heard by a patient effectively reduces to nothing.

Figure 1:
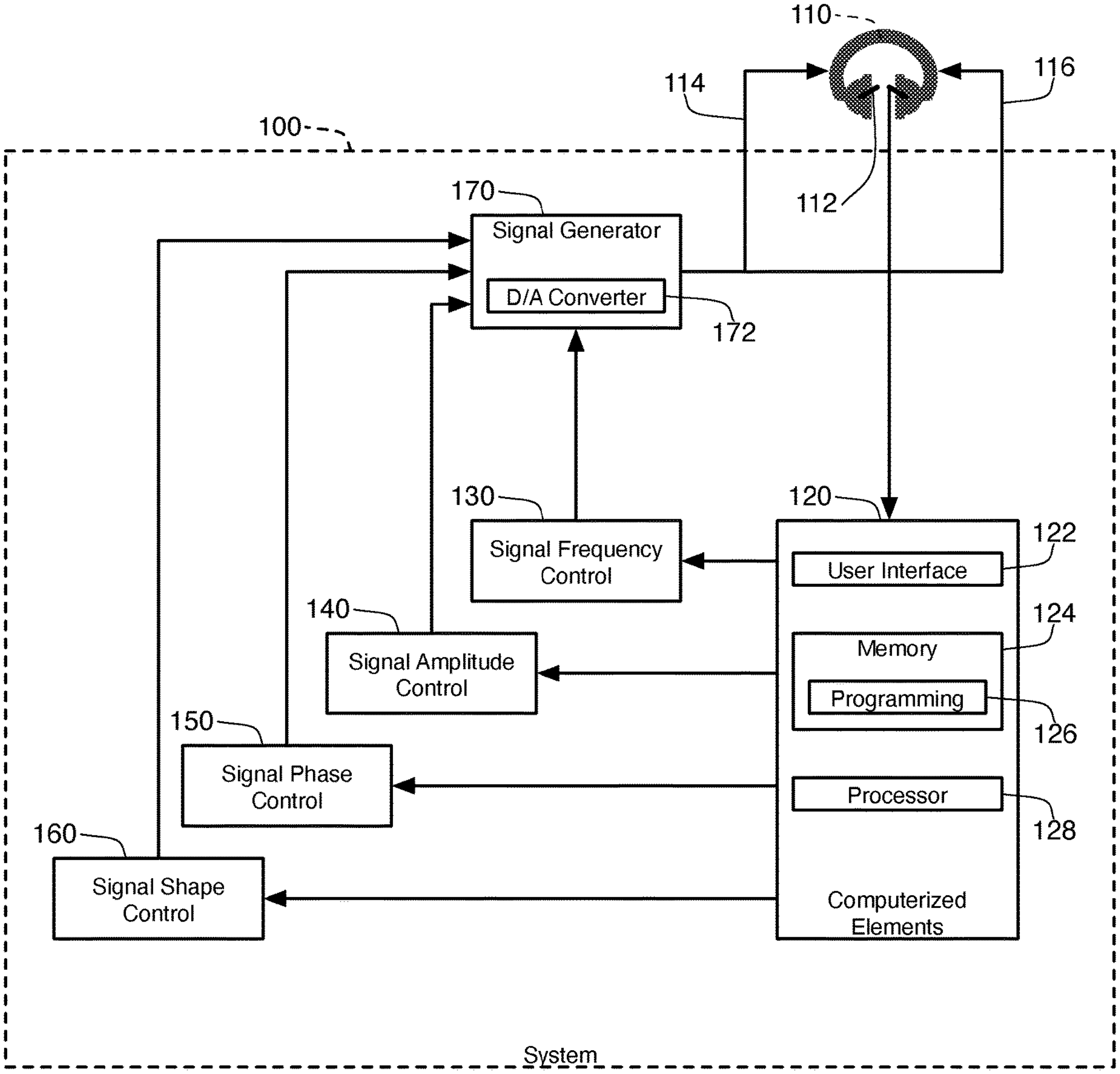
FIG. 1 is a diagrammatic illustration of an embodiment of a tinnitus analysis system.

An exemplary embodiment of a system 100 for detecting and treating tinnitus is shown in FIG. 1. The system 100 may include or be configured to connect to speakers 110 that deliver separate audio signals 114 and 116 to each ear of a patient (not shown). In some embodiments, the speakers 110 make take the form of unified headphones that are capable of delivering different sound signals into each ear, while in other embodiments the speakers comprise ear buds that reside partially within each ear. In at least one embodiment, the speakers 110 include microphones (or sensors) 112 for potentially detecting the tinnitus signal present in the ear.

The system 100 includes a computer or computerized elements 120. The computerized elements 120 includes a user interface 122, electronic data memory 124, programming 126 and a processor 128. The computer programming 126 via the user interface 122 allows the patient user (not shown) to create digital auditory signals that may then be processed and shaped by various controls (discussed in greater detail below) 130, 140, 150, 160, and then delivered to a signal generator 170 where the signal(s) is(are) converted to an analog audio signal, via a digital/analog converter 172. The resulting audio signal 114 or 116 is then delivered to one ear of the patient via the speakers 110. In some embodiments, the digital/analog converter 172 may be incorporated into the speakers 110 and the system 100 provides a digital signal to the speakers 110.

The aforementioned controls for modifying the digital signals created by the computer 120 include: a signal frequency control 130, for changing the frequency of the digital signals; a signal amplitude control 140, for changing the amplitude of the digital signals, a signal phase control 150 for changing the phase of the digital signals, and a signal shape control 160 for adjusting the shape of the digital signals.

In some embodiments, controls 130, 140, 150 and 160 may be individual hardware-based controls that the user/patient may manually access in the form of sliders, knobs, buttons, etc. In some embodiments, controls 130, 140, 150 and 160 are accessed via the user interface 122. In some embodiments, controls 130, 140, 150 and 160 are themselves controlled by the programming 126 or are an aspect of the programming 126.

Figure 2:
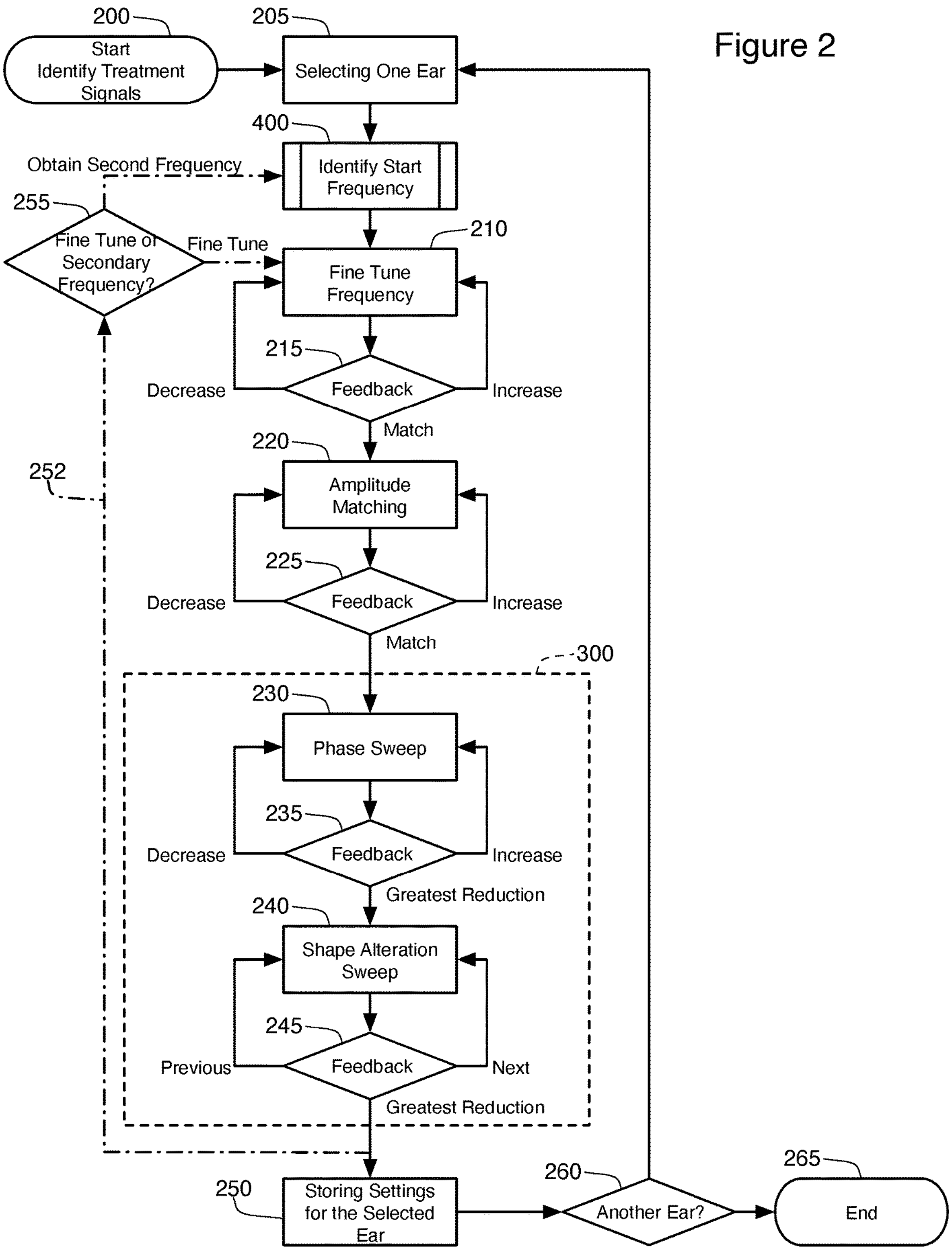
FIG. 2 is a diagrammatic illustration of the process steps of a single ear analysis method using the system shown in of FIG. 1.
Figure 3:
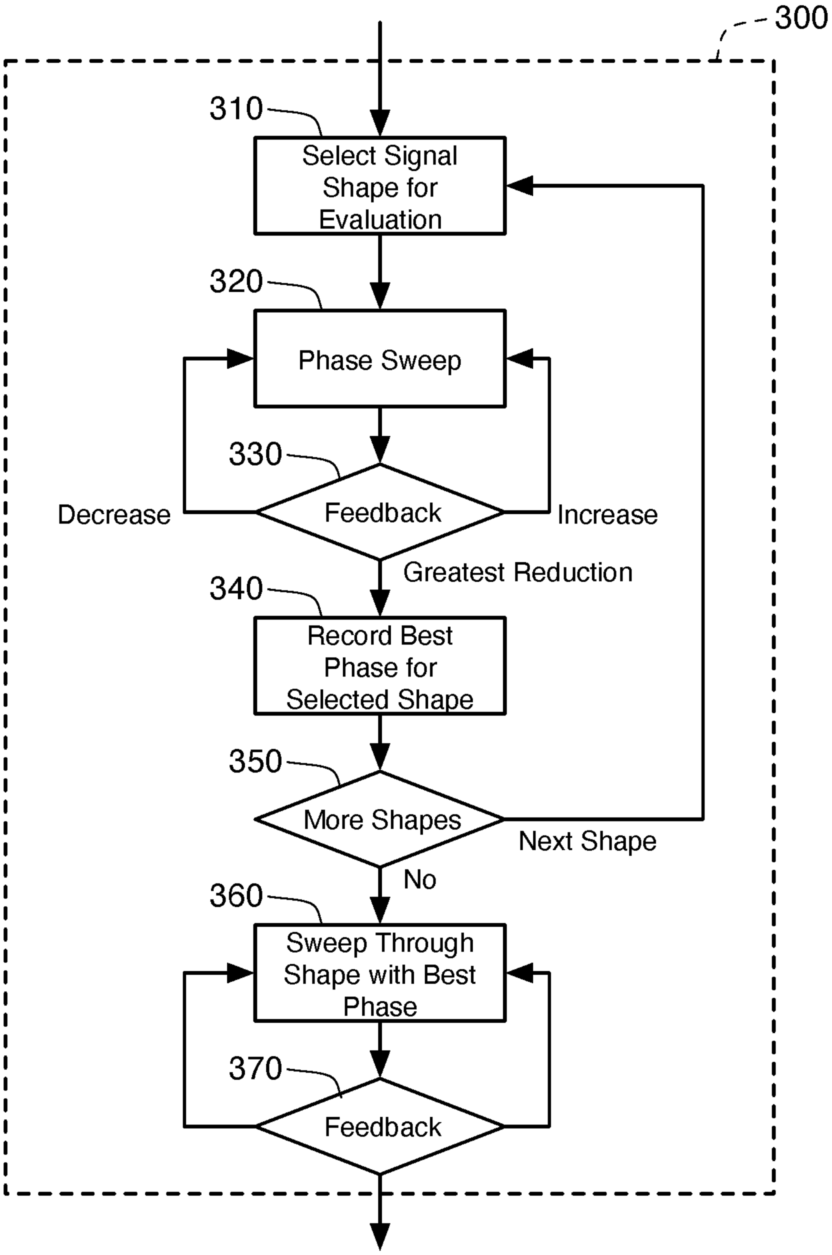
FIG. 3 is a diagrammatic illustration of a portion of the analysis method shown in FIG. 2 utilizing an alternative subroutine.
Figure 4:
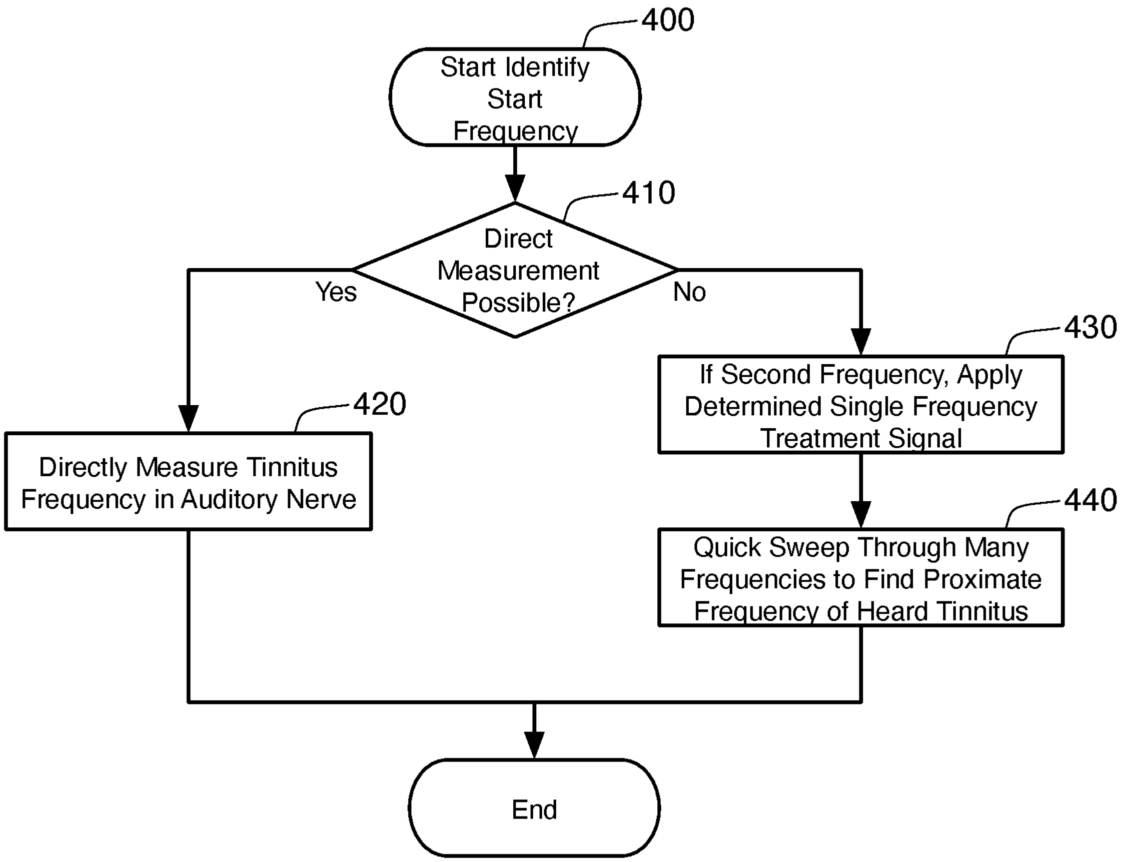
FIG. 4 is a diagrammatic illustration of a portion of the analysis method shown in FIG. 2 utilizing an alternative sub-process.

Whether or not the system detects the presence of tinnitus via the microphones or sensors 112, the system 100 is configured to allow the patient to identify separate treatment signal settings for each ear, in turn, such as by the tinnitus analysis method steps shown in FIGS. 2-4.

At block 200 the patient starts the analysis by selecting which ear to treat at block 205. The system 100 (see FIG. 1) will then, at block 400, initiate the analysis session by identifying and transmitting, to the appropriate speaker for the selected ear, an initial acoustic signal at a first frequency. As shown in FIG. 4, the selection of the starting frequency can be accomplished in different manners. Step 410 determines, for instance, if it is possible to directly sense or measure the frequency of the tinnitus using the microphone or sensor 112. If so, the initial signal frequency may be determined based on an analysis of the tinnitus signal detected by that sensor 112 (see FIG. 1) by directly measuring tinnitus frequency from the auditory nerve (step 420).

If direct measurement isn't possible as determined by step 410, the computerized elements 120 will help the user to select an approximate frequency to begin process 200. In some cases, as described below, the selection of the frequency will actually be the selection of a second frequency that is presented on top of the first frequency. In these cases, step 430 will first include the determined first frequency signal (as determined after step 245 as described below) and then add on a second frequency to be selected by the user. If this is the selection of the first frequency, then only that frequency will be presented. The selection of the frequency is made at step 440 by presenting a sound wave to the patient having varying frequencies. For example, a pure sine wave of a single frequency can be presented, and the frequency can slowly change. In effect, the sine wave frequency varies through a range of frequencies that have been found to be similar to tinnitus symptoms. Alternatively, a broad range of frequencies can be presented. In one embodiments, frequencies from 1000 Hz to 10 KHz are presented. In effect, the sound can sweep through frequencies slowly until the user indicates that a close approximate is reached.

After the selection of the starting frequency through sub-method 400, fine tuning can then occur. Starting at block 210, the frequency of the acoustic signal may be fine-tuned (increased or decreased). A frequency adjustment signal is provided at step 210 that allows for the user to compare the frequency of the frequency adjustment signal against the frequency of their tinnitus symptoms in that ear. Based on the feedback of the patient/user, provided at block 215, the patient/user may adjust the signal frequency via control 130 until the frequency is closer to or even matches that of the tinnitus. Various algorithms can be used to move or sweep between alternatives frequencies in order to help identify the preferred frequency. A linear algorithm simply requests that the user provide an "increase" or "decrease" signal through feedback 215, and the provided frequency is appropriately adjusted. Other algorithms are possible and are known for matching the pitch of a given signal, including a "divide and conquer" technique and a dynamic, or successive approximation algorithm.

Once the patient confirms that the frequency of the signal matches that of the tinnitus, or is as close as the patient/user can determine, the amplitude of the signal is adjusted to match that of the tinnitus by providing an amplitude matching signal at block 220 and allowing feedback at block 225. In effect, the patient/user/computer is manipulating the amplitude control 140 to change the amplitude of the amplitude matching signal provided at block 220. While the amplitude of the amplitude matching signal is variable in order to fine the match, the frequency of the amplitude matching signal remains at the frequency determined through steps 210, 215. The algorithm used by the patient to match the amplitude again involves feedback 225 from the user that increases or decreases the amplitude of the signal provided to the headphones 110 for the amplitude match 220.

Similarly, at block 230 and 235, the frequency chosen through steps 210, 215 and the amplitude chosen through steps 220, 225 are used to present a phase adjustment signal to adjust the phase at steps 230, 235. In some embodiments, the phase adjustment signal is a sine wave of the selected frequency and amplitude, where the phase is adjusted to bring the signal closer to the tinnitus sound and thus reduce its perceived impact.

The phase sweep steps 320, 235 slowly alter the phase of the phase adjustment signal presented to the patient/user. The phase is allowed to sweep through an entire 360-degree range, and in some instances the phase sweep repeats once the entire 360-degree range is completed. Where the patient user is prompted to approximate the tinnitus frequency in steps 210, 215; and to approximate the tinnitus amplitude in steps 220, 225; the user in this phase sweep steps 230, 235 is asked to indicate whether or not the tinnitus is reduced. If so, the user is then asked to select, using the feedback 235, the degree of phase alteration that most reduces the tinnitus symptoms.

The feedback 235 from the user/patient regarding the phase of the phase adjustment signal effectively manipulates the phase control 150, so that the phase shift of the phase adjustment signal is increased or decreased when provided at step 230 to determine the greatest reduction in the tinnitus interference. In some embodiments, the computer 120 will run a sweep of various phases with the user/patient providing feedback as to whether or not a selected phase change results in a reduction of the tinnitus.

It is known that the tinnitus symptom heard by patients is not a pure sine wave of a single frequency. While there is usually a dominant frequency, nearby frequencies and harmonic frequencies are often present. Because of this, some patients experience a reduction of tinnitus symptoms when using the above phase sweep steps 230, 235, but are not able to completely eliminate tinnitus symptoms.

Experimentation has revealed that additional relief of tinnitus symptoms can be obtained by varying the shape of the signal presented to the individual. For example, rather than sending a pure sine wave of a given frequency and amplitude, results are improved by sending a saw-tooth wave, a square wave, or even a rectangle or pulse signal of the same frequency and amplitude.

Consequently, the next step in the method of FIG. 2, is to vary the shape of the wave presented to the patient/user by presenting a shape adjustment signal through step 240. The variation of shapes can be a step-wise variation, in which a variety of shapes are presented one after another, such as sine wave, square wave, triangular wave, saw-tooth wave, pulsed wave, all of which have the same fundamental frequency and amplitude. Each of these different shapes (other than the pure sine wave) is actually composed of a plurality of different frequency of sound waves that together form the shaped waveform of the selected shape. For example, square waves are composed of multiple frequencies, namely the fundamental frequency and harmonics at whole, odd-number multiples of the fundamental frequency. In some embodiments arbitrary complex waveform shapes and/or arbitrary combinations of discrete frequency components, each having independent amplitude, phase, and frequency may be employed during the shape sweep.

At block 240 the system 100 presents as sound these differently shaped waves (the shape adjustment signal) into the selected ear of the patient/user. At block 245, the patient/user indicates which shape best reduces the tinnitus symptoms. The different wave shapes will be presented at the frequency determined by steps 210, 215, and the amplitude determined by steps 220, 225. In addition, the shape adjustment signal can be presented at the same relative phase offset as determined by steps 230 and 235. Alternatively, each wave shape can be separately presented with the entire 360-degree phase sweep before moving to the next shape such as in the manner depicted in FIG. 3 and described in greater detail below.

Figure 8:
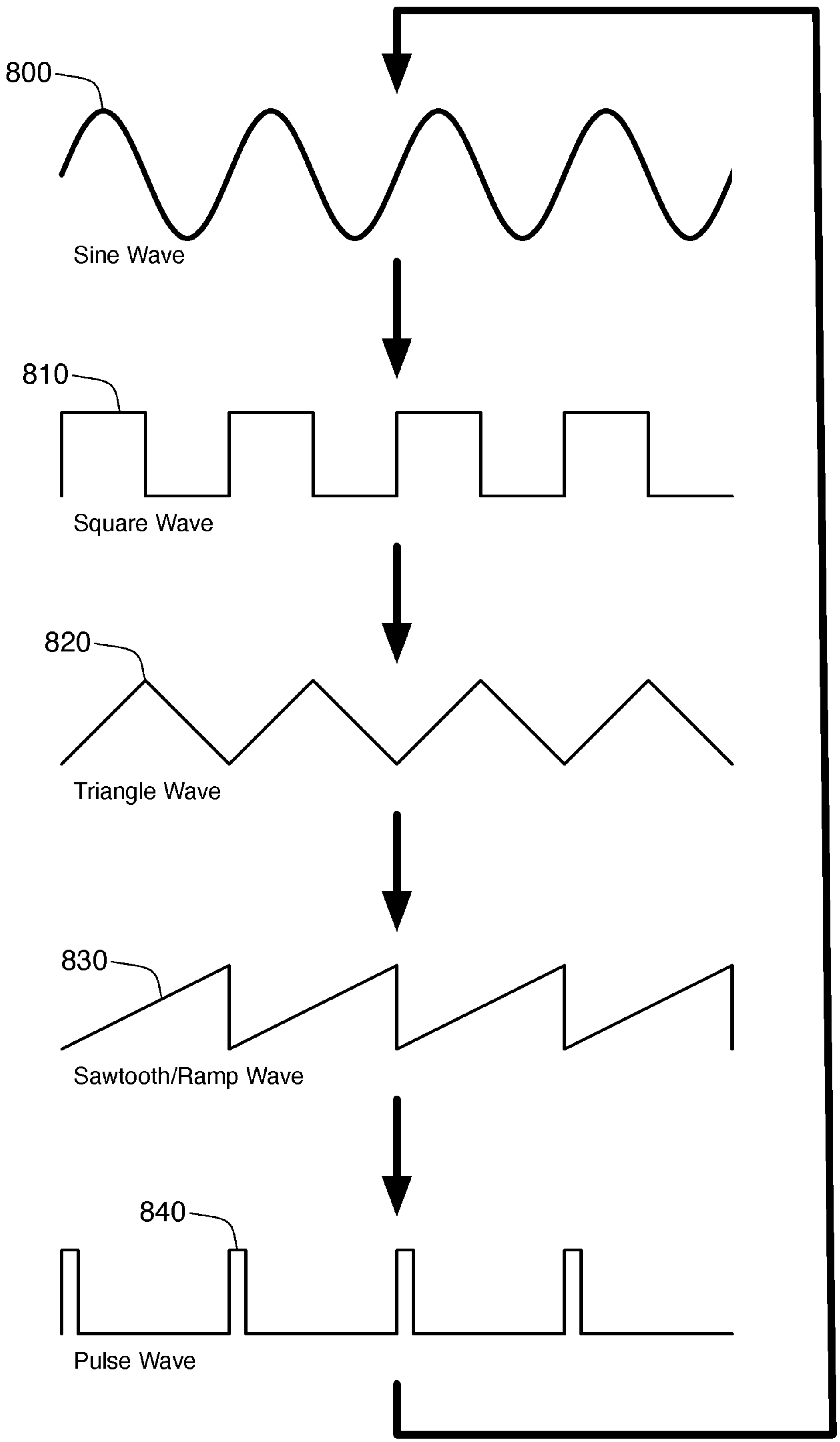
FIG. 8 is a diagrammatic illustration of the process of signal shape matching as shown in the process steps of FIGS. 2 and 3.

At block 245 the shape of the signal may be adjusted and matched to that of the tinnitus via manipulation of the shape control 160. In some embodiments the computer 120 will run a sweep of various shape changes with the user/patient providing feedback as to whether or not a selected signal shape results in the greatest reduction of the tinnitus. An example of this selection process is illustrated in FIG. 8, with samples of signal shapes that the computer 120 may provide depicted. As shown the computer 120 may provide the signal shape in the form of a sine wave 800, a square wave 810, a tringle wave 820, a sawtooth/ramp wave 830, a pulse wave 840, etc.

As mentioned above, it is understood that for some signal shapes, the system 100 is producing not just a single frequency (such as in the case of a simple sine wave 800), but multiple frequencies (including, for example, harmonics of the primary frequency) that are combined to create an approximation of the desired shape (e.g., a square wave 810, sawtooth/ramp wave 830, etc.). By combining more numerous frequencies the system 100 may create signals that are even closer approximations of the desired signal shape that will trigger the cancellation or significant reduction of the tinnitus symptoms.

In some embodiments, step 240 does not pass step-wise through the different shapes, but rather sweeps from one shape to another, thereby allowing the patient to hear intermediate shapes that exist between, for example, the shapes that exist between a sine wave and a saw-tooth wave. In other embodiments, the different shapes can be altered randomly until the patient identifies further reduction in tinnitus symptoms.

In yet another embodiment, the different harmonics that are used to convert a sine wave into one of the wave shapes are added in a step wise fashion. For example, the square wave is approximated at first by presenting the fundamental frequency sine wave and adding in the third harmonic at the appropriate amplitudes. Next, the fifth harmonic can be added to more closely approximate the square wave, followed by the seventh, ninth, and further odd harmonics. Once all the desired harmonics are added to create the square wave, the necessary harmonics to create a saw-tooth wave are added one after another. The patient can select any shape, or any partially formed wave shape, as the wave shape that most impacts the tinnitus symptoms.

The intended result of this manipulation of the frequency, amplitude, phase, and shape of the signal created by the system 100 is to provide a treatment signal that is transmitted to the affected ear of the patient/user in order to cancel the tinnitus sound. Preferably, this results in a null output; perceived as nominal silence by the patient in the previously tinnitus afflicted ear. A null output is always the desired goal. While the result may not be permanent, in many cases a null output is received that eliminates tinnitus symptoms for multiple days.

Figure 7:
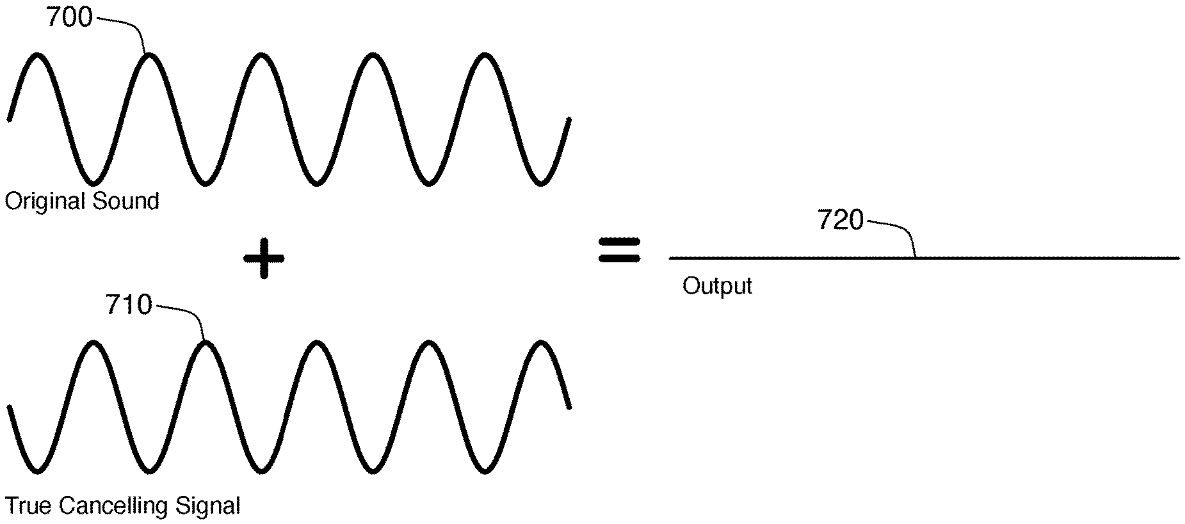
FIG. 7 is a graphical illustration of two sound signals at a 180-degree phase shift resulting in a cancelled signal.

As shown in FIG. 7, a true canceling wave 710 exactly matches the shape, frequency, and amplitude of an original signal 700, and is then shifted exactly 180 degrees from the original signal. The resulting combination of these two waves 700, 710 is the flat, canceled output 720. The described embodiments acknowledge that the treatment signal created may not exactly duplicate a wave that represents the "heard" tinnitus signal of a patient. Thus, the treatment signal may not take the form of a perfect cancelation signal that exactly matches the heard tinnitus with a 180 degree shift. This means that the therapeutic effect that results from the above treatment may not result from a cancellation of the tinnitus signal. In other words, the null output that is frequently obtained through the generation of a treatment signal is not technically a noise cancellation of the type shown in FIG. 7. Nonetheless, significant reduction of the symptoms still results from the application of the above process. This is generally considered a type of auditory residual inhibition, and it provides real symptom relief to patients.

Returning to the analysis method of FIG. 2, by using periodic waves of different shapes to perform the reduction of the tinnitus symptom, the above process is actually applying multiple frequencies to the canceling signal to best approximate the sound heard as a result of the patient's tinnitus. The square wave, for instance, includes the odd harmonics of a frequency in addition to that fundamental frequency. Testing indicates that better tinnitus inhibition results are achieved in some patients by including these odd harmonics in the form of a square wave than are achieved with sine waves. Likewise, other patients achieve better results through the use of the triangle or saw tooth wave when compared with a sine wave that repeats at the same fundamental frequency and amplitude.

In FIG. 2, it is noted that the frequency (at steps 210, 215) and the amplitude (220, 225) are selected before the sweep (steps 230, 235) and shape (steps 240, 245) are analyzed. In one embodiment, a fine tuning of frequency and amplitude is performed through optional path 252 after the shape is determined. Step 255 determines that fine tuning is desired, and steps 210-225 are reapplied on the selected phase and shape. This is useful because it can sometimes be easier for a patient to select the best frequency and amplitude by listening to a signal based on the selected shape and phase. The reapplication of these steps 210-225 can be limited to frequencies and amplitudes that are proximal to the frequency and amplitude first selected by the patient in order to speed the application of these steps.

In addition, it is possible to perform the above steps and find that the patient now has an alternate, remainder tinnitus signal that is left after the cancelation performed by the above steps. The remainder signal will often be of a different primary frequency and amplitude than the untreated, primary tinnitus symptom. In one embodiment, the above steps will then be repeated to remove this remainder signal by fine tuning the original signal frequency or obtaining a second frequency. In this case, block 255 determines that the secondary frequency analysis is desired. As explained above in connection with step 430, if a second treatment signal is to be identified, it is analyzed on top of the determined first treatment signal. In this way, the frequency, amplitude, phase sweep, and shape of the secondary signal can be analyzed using steps 210-245. In many cases, the null result (elimination of the tinnitus symbol) is achieved (or is more closely achieved) only with the combination of the first treatment signal and the determined secondary signals.

Once the system created signals have been manipulated to mitigate the tinnitus or cancels it completely, the system 100, at block 250, will store the signal characteristics for the treated ear to memory 124. These characteristics or settings include the selected frequency, amplitude, phase, and shape for at least a primary frequency and perhaps for a secondary frequency as well. The patient/user may then proceed at block 260 to restart the analysis process for application to the yet untreated ear. Once both ears have been treated the process is finished at block 265.

As is shown in FIG. 2, the steps of phase manipulation and selection (230, 235), as well as the steps of shape manipulation and selection (240, 245 may be considered as a subroutine 300 of the method 200 shown.

In an alternative embodiment shown in FIG. 3, subroutine 300 is modified such that the system 100 first select a signal shape for evaluation at block 310. At block 320 the selected signal shape is subjected to a phase sweep. The patient/user at block 330 provides feedback as to which of the selected phase changes result in the greatest reduction of the tinnitus. Once the best phase for the selected shape is determined, at block 340 the system 100 records the selected shape and phase.

At block 350 the system 100 selects additional signal shapes to sweep to analyze via phase sweep, and then repeats the process returning the newly selected signal shape to block 310. The system 100 may conduct the phase sweep process for as many signal shapes as desired.

When the desired selections of signal shapes have been phase swept, the system 100, at block 360 will sweep through each of the shapes with the best phase by presenting them each to the patient/user, who, at block 370 provides feedback until the signal with the best shape and phase (in terms of cancelling the tinnitus) is selected and recorded at block 250 (see FIG. 2). As with the original methodology of FIG. 2, even after the best shape and phase are selected, it may still be necessary to go back and fine tune the frequency and amplitude matching via line 252 in the manner previously described.

Figure 5:
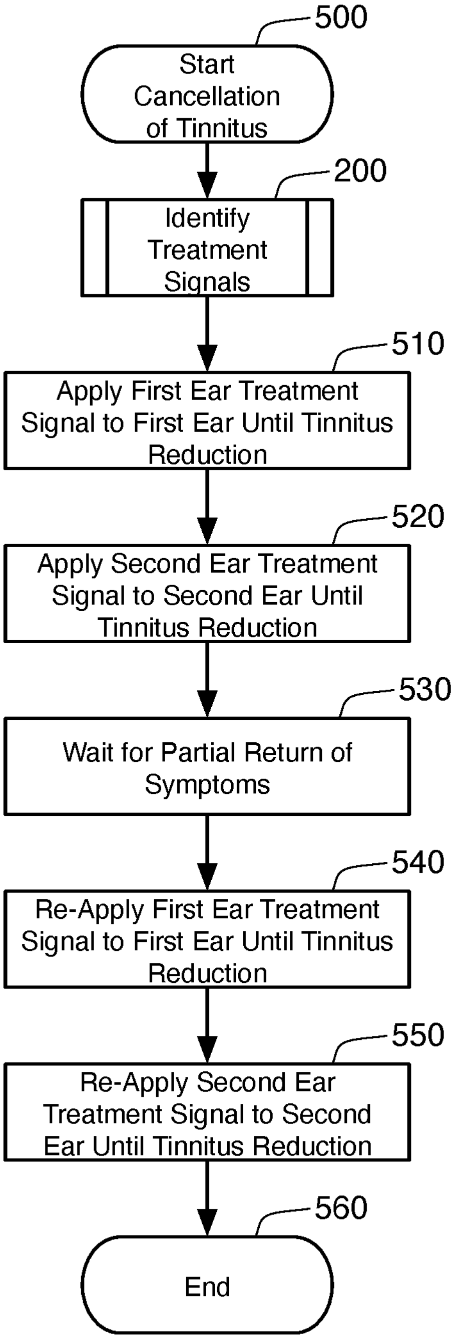
FIG. 5 is a diagrammatic illustration of a tinnitus treatment process.

The above analysis of tinnitus in each ear of the patient/user results in audio signals profiles 114 and 116 (see FIG. 1) that may be incorporated into a tinnitus cancelation method such as is depicted in FIG. 5.

The treatment method starts at block 500. At block 200 the system 100 identifies the signals 114 and 116 such as in the manner shown in FIG. 2, or accesses them from memory 124 if they have already been determined. At block 510, the selected for first ear treatment signal 114 is applied to the first ear of the patient/user until tinnitus is reduced or cancelled in the first ear. At block 520, the selected for second ear treatment signal 116 is applied to the second ear of the patient/user until tinnitus is reduced or cancelled in the second ear. At this point, auditory residual inhibition of at least some of the tinnitus symptoms has occurred.

At block 530, the patient/user waits for tinnitus symptoms to return. In some cases, one or more days or even weeks may pass before any symptoms return. If and when symptoms do return to either ear of the patient/user after this delay, then in the case of the symptoms returning to the first ear, at block 540, the selected for first ear treatment signal 114 is re-presented to the first ear of the patient/user until tinnitus is reduced or cancelled in the first ear. If the tinnitus symptoms return to the second ear, then at block 550, the selected for second ear treatment signal 116 is re-applied to the second ear of the patient/user until tinnitus is reduced or cancelled in the second ear. The treatment process ends at block 560 or reapplication of the signals such as in blocks 530, 540, and 550 may be revisited as needed.

The system 100 and both the analysis methods of FIGS. 2 and 3, and the treatment method of FIG. 5 may be incorporated into any of a variety of electronic devices having the necessary computer components and sound output capability. For example, a hearing aid can be programmed to provide the signals, sweep through variations in the signal, and receive input from the user when the appropriate frequency and/or amplitude and/or phase shift and/or signal shape is reached. The device can then present the cancelation signal to the patient.

The resulting signal can be stored in the device and applied at a later time. It may be that the signal can be useful for repeated treatments as is. In other embodiments, the signal can be recalled, but the appropriate phase shift can be re-determined and then applied. In other embodiments, the resulting signal is not saved for later applications. Rather, the user is simply asked to repeat the above process for each treatment using the device. In some cases, the signal is stored as a sound file. In other cases, the signal is stored as settings that can be used to re-create the treatment signal.

Figure 6:
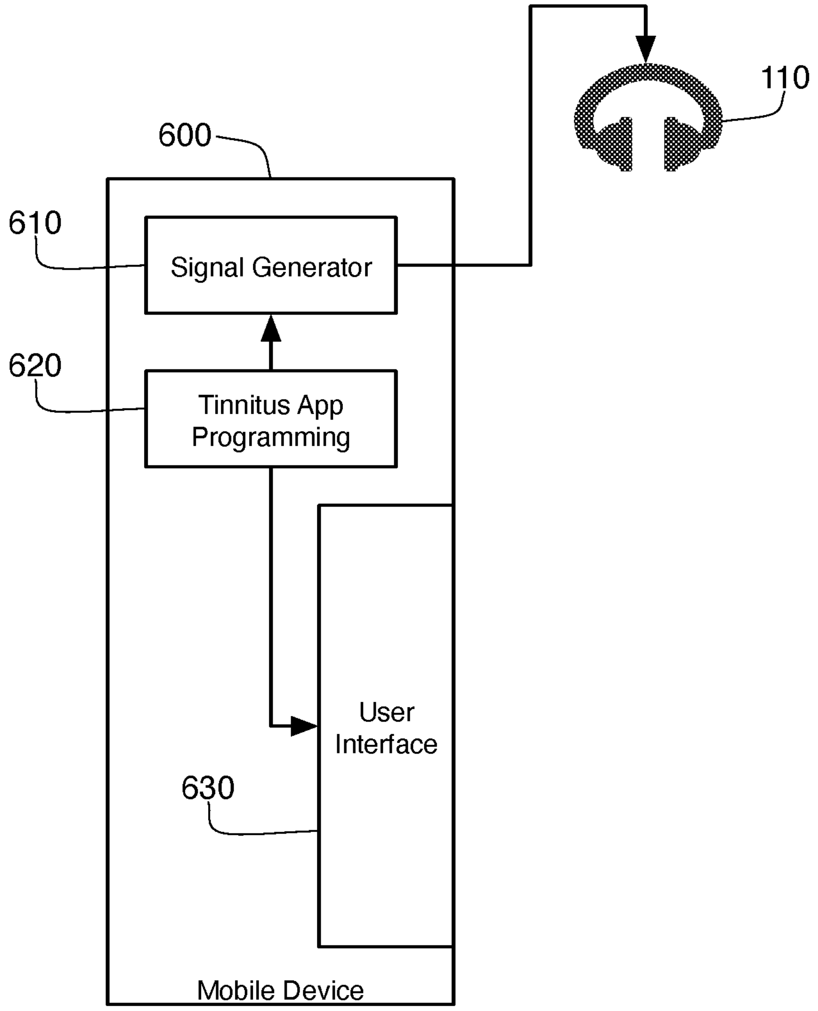
FIG. 6 is a diagrammatic illustration is an alternative embodiment of the system shown in FIG. 1.

In one embodiment the system 100 and methods of analysis and treatment are incorporated into a handheld electronic device such as a smart phone or other mobile device 600, an example of which is depicted in FIG. 6. Such mobile devices already contain the computer elements 120 such as are depicted in FIG. 1, which would be supplemented with dedicated programing in the form of tinnitus analysis and treatment application 620 that would communicate with the device's signal generator 610. The various signal controls 130, 140, 150 and 160 such as are shown in FIG. 1 would be accessible via the user interface 630 of the device 600 or be automatically controlled by the application 620. A user might be directed to run through process 200 and 500 with the help of a technical or medical assistant, but then could be free to reapply the signals (steps 530, 540, 550) at home. In other embodiments, the app 620 would direct the user to run through the above methods without assistance using only the user interface 630 of the mobile device.

In one alternative embodiment, the determine of a phase shift through steps 230, 235 is skipped. In these cases, the frequency adjustment signal is the first audible signal presented to the user, the amplitude adjustment signal of the selected frequency is the second audible signal presented to the user, and the shape adjustment signal of the selected frequency and amplitude is the third audible signal. The phase adjustment signal, if included, could be considered the fourth audible signal presented to the user for adjustment.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for treating tinnitus comprising:

a) identifying separate treatment signal settings for a patient having a heard left-ear tinnitus noise in a left ear and a heard right-ear tinnitus noise in a right ear by separately selecting each ear in turn, wherein treatment signal settings for a selected ear are identified by:
   i) presenting a first audible signal to the selected ear at a variety of frequencies,
   ii) receiving confirmation that a first frequency for the first audible signal is near a tinnitus frequency for the heard tinnitus noise in the selected ear,
   iii) presenting a second audible signal to the selected ear at the first frequency, the second audible signal being presented at a variety of amplitudes,
   iv) receiving confirmation that a first amplitude for the second audible signal is near a tinnitus amplitude for the heard tinnitus noise in the selected ear,
   v) presenting a third audible signal to the selected ear at the first frequency and the first amplitude, the third audible signal being presented with a variety of wave shapes,
   vi) receiving confirmation that a first wave shape for the third audible signal triggers a reduction in the heard tinnitus noise in the selected ear, and
   vii) storing the first frequency, the first amplitude, and the first wave shape as the separate treatment signal settings for the selected ear;

b) using the treatment signal settings for the left ear to generate a left ear treatment signal that is presented to the left ear, wherein the left ear treatment signal is not a noise cancellation signal for the heard left-ear tinnitus noise; and c) using the treatment signal settings for the right ear to generate a right ear treatment signal that is presented to the right ear wherein the right ear treatment signal is not a noise cancellation signal for the heard right-ear tinnitus noise.

2. The method of claim 1, wherein the first frequency is fine-tuned against the heard tinnitus noise in the selected ear after receiving the confirmation that the first wave shape triggers the reduction in the heard tinnitus noise for the selected ear.

3. The method of claim 2, wherein the first frequency is fine-tuned by presenting a fourth audible signal at the first amplitude and the first wave shape at a plurality of frequencies proximal to the first frequency.

4. The method of claim 3, wherein the first amplitude is fine-tuned against the heard tinnitus noise in the selected ear by presenting a fifth audible signal at the first frequency and the first wave shape at a plurality of amplitudes proximal to the first amplitude.

5. The method of claim 1, further comprising:

d) after a delay, re-presenting the left ear treatment signal to the left ear and re-presenting the right ear treatment signal to the right ear.

6. The method of claim 5, wherein the delay is longer than a day.

7. The method of claim 5, wherein the left ear treatment signal and the right ear treatment signal are saved as recordings, and the recordings are used to re-present the left ear treatment signal to the left ear and re-present the right ear treatment signal to the right ear.

8. The method of claim 5, wherein the left ear treatment signal and the right ear treatment signal are recreated using the separate treatment signal settings.

9. The method of claim 1, further comprising:

(1) presenting a fourth audible signal to the selected ear at the first frequency and the first amplitude, the fourth audible signal being presented at a variety of phase shifts, (2) receiving confirmation that a first phase shift for the fourth audible signal reduces the heard tinnitus noise in the selected ear, and (3) storing the first phase shift as part of the separate treatment signal settings for the selected ear.

10. The method of claim 9, wherein the fourth audible signal is presented after the third audible signal, wherein the fourth audible signal is presented using the first wave shape.

11. The method of claim 9, wherein the fourth audible signal is presented before the third audible signal, wherein the third audible signal is presented using the first phase shift.

12. The method of claim 1, wherein the variety of wave shapes comprises a sine wave and a square wave.

13. The method of claim 12, wherein the variety of wave shapes further comprises a triangle wave, a pulse wave, and a sawtooth wave.

14. The method of claim 13, wherein the third audible signal is presented with the variety of wave shapes by stepping switching between the sine wave, the square wave, the triangle wave, and the sawtooth wave.

15. The method of claim 13, wherein the variety of wave shapes further comprises intermediate wave shapes that comprise a transition from one shape to another.

16. A mobile device comprising:

a) a processor that processes programming instructions;

b) a sound output that separately outputs sound for a left ear and a right ear;

c) a tinnitus app comprising a plurality of programming instructions that instruct the processor to:
   i) identify separate signal settings for the left ear and the right ear by separately selecting each ear in turn, wherein signal settings for a selected ear are identified by:
      (1) presenting a first audible signal to the selected ear through the sound output at a variety of frequencies,
      (2) receiving confirmation through a user interface that a first frequency for the first audible signal is near a tinnitus frequency,
      (3) presenting a second audible signal to the selected ear through the sound output at the first frequency, the second audible signal being presented at a variety of amplitudes,
      (4) receiving confirmation through the user interface that a first amplitude for the second audible signal is near a tinnitus amplitude,
      (5) presenting a third audible signal to the selected ear through the sound output at the first frequency and the first amplitude, the third audible signal being presented with a variety of wave shapes, (6) receiving confirmation through the user interface that a first wave shape for the third audible signal triggers a reduction in a heard tinnitus noise in the selected ear, and (7) storing the first frequency, the first amplitude, and the first wave shape as the separate signal settings for the selected ear;

d) using the signal settings for the left ear to generate a left ear sound signal that is presented to the left ear, wherein the left ear sound signal is not a noise cancellation signal for the heard tinnitus noise in the left ear; and e) using the signal settings for the right ear to generate a right ear sound signal that is presented to the right ear, wherein the right ear sound signal is not a noise cancellation signal for the heard tinnitus noise in the right ear.

17. The mobile device of claim 16, wherein the programming instructions further instruct the processor to identify separate signal sittings by presenting a fourth audible signal to the selected ear at the first frequency and the first amplitude, the fourth audible signal being presented at a variety of phase shifts, and receiving confirmation that a first phase shift for the fourth audible signal reduces the heard tinnitus noise in the selected ear.

18. The mobile device of claim 16, wherein the programming instructions further instruct the processor to identify separate signal sittings by presenting a fourth audible signal to the selected ear at the first frequency and the first amplitude, the fourth audible signal being presented at a variety of phase shifts; receiving confirmation that a first phase shift for the fourth audible signal reduces the heard tinnitus noise in the selected ear; and storing the first phase shift as part of the separate signal settings for the selected ear.

19. The mobile device of claim 16, wherein the variety of wave shapes comprises a sine wave and a square wave.

20. The mobile device of claim 16, wherein the variety of wave shapes further comprises a triangle wave, a pulse wave, and a sawtooth wave.

* * * * *